United States Patent
Childress et al.

(10) Patent No.: US 9,521,045 B1
(45) Date of Patent: *Dec. 13, 2016

(54) MANAGEMENT OF DECOMMISSIONED SERVER ASSETS IN A SHARED DATA ENVIRONMENT

(71) Applicant: International Business Machines Corporation, Armonk, NY (US)

(72) Inventors: Rhonda L. Childress, Austin, TX (US); David B. Kumhyr, Austin, TX (US); Michael J. Spisak, East Northport, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/163,322

(22) Filed: May 24, 2016

Related U.S. Application Data

(63) Continuation of application No. 15/074,044, filed on Mar. 18, 2016, now Pat. No. 9,426,167, which is a continuation of application No. 14/941,776, filed on Nov. 16, 2015.

(51) Int. Cl.
  *H04L 12/24* (2006.01)
  *H04L 12/26* (2006.01)
  *H04L 29/12* (2006.01)
  *G06F 15/173* (2006.01)

(52) U.S. Cl.
  CPC ......... *H04L 41/147* (2013.01); *H04L 41/065* (2013.01); *H04L 61/103* (2013.01)

(58) Field of Classification Search
CPC combination set(s) only.
See application file for complete search history.

(56) References Cited

U.S. PATENT DOCUMENTS 6,691,165 B1 * 2/2004 Bruck ............... H04L 29/12009
  709/227
6,801,949 B1 * 10/2004 Bruck ............... H04L 29/12009
  709/232

(Continued)

FOREIGN PATENT DOCUMENTS

FI   WO 2013190180 A1 * 12/2013 ............. H04L 47/70
WO   2013190180 A1    12/2013

OTHER PUBLICATIONS

Childress et al.; U.S. Appl. No. 14/941,776, filed Nov. 16, 2015; Entitled "Management of Decommissioned Server Assets in a Shared Data Environment".

(Continued)

*Primary Examiner* — Saket K Daftuar
(74) *Attorney, Agent, or Firm* — Alexa L. Ashworth

(57) ABSTRACT

Embodiments of the present invention provide systems and methods for monitoring decommissioned servers in a shared data environment. Embodiments of the present invention can be used to aggregate information associated with an environment from external resources, and calculate a baseline of server activity from the aggregated information. When new information is received, it is compared to the baseline of server activity in order to determine a possible misuse of the server assets, when inconsistencies are detected between the baseline of activity and the new information.

1 Claim, 4 Drawing Sheets

(56) References Cited

U.S. PATENT DOCUMENTS

| | | | | |
|---|---|---|---|---|
| 7,114,070 | B1* | 9/2006 | Willming | H04L 29/12273 380/30 |
| 7,281,036 | B1* | 10/2007 | Lu | H04L 29/12028 709/220 |
| 7,299,294 | B1* | 11/2007 | Bruck | H04L 29/12216 709/201 |
| 7,546,354 | B1* | 6/2009 | Fan | G06F 11/2025 709/219 |
| 7,551,559 | B1* | 6/2009 | Jonnala | H04L 63/1466 370/230 |
| 8,396,890 | B2* | 3/2013 | Lim | G06F 17/3089 707/781 |
| 8,600,977 | B2* | 12/2013 | Dageville | 707/718 |
| 8,997,051 | B2* | 3/2015 | Robertson | G06F 8/62 717/120 |
| 9,015,318 | B1* | 4/2015 | Batz | H04L 12/14 709/217 |
| 2002/0075844 | A1* | 6/2002 | Hagen | H04L 63/0442 370/351 |
| 2002/0078382 | A1* | 6/2002 | Sheikh | H04L 12/2602 726/22 |
| 2006/0129695 | A1* | 6/2006 | Faibish | H04L 29/12009 709/245 |
| 2007/0094375 | A1* | 4/2007 | Snyder | G06Q 10/06 709/223 |
| 2007/0192863 | A1* | 8/2007 | Kapoor | G06F 9/505 726/23 |
| 2008/0229415 | A1* | 9/2008 | Kapoor | G06F 21/55 726/22 |
| 2008/0262991 | A1* | 10/2008 | Kapoor | G06F 21/55 706/20 |
| 2009/0106219 | A1* | 4/2009 | Belknap | G06F 17/30463 |
| 2009/0210519 | A1* | 8/2009 | Zill | H04L 12/12 709/220 |
| 2010/0027551 | A1* | 2/2010 | Arkin | H04L 29/12028 370/400 |
| 2011/0213869 | A1* | 9/2011 | Korsunsky | G06F 21/55 709/223 |
| 2011/0231510 | A1* | 9/2011 | Korsunsky | G06F 21/55 709/213 |
| 2011/0231564 | A1* | 9/2011 | Korsunsky | G06F 21/55 709/231 |
| 2011/0238855 | A1* | 9/2011 | Korsunsky | G06F 21/55 709/231 |
| 2012/0240185 | A1* | 9/2012 | Kapoor | H04L 63/1425 726/1 |
| 2013/0198362 | A1* | 8/2013 | Abuelsaad | H04L 41/24 709/224 |
| 2013/0269030 | A1* | 10/2013 | Milford | G06F 21/50 726/22 |
| 2014/0115148 | A1 | 4/2014 | Abuelsaad et al. | |
| 2014/0115371 | A1* | 4/2014 | Abuelsaad | H04L 43/0817 713/340 |
| 2015/0071085 | A1* | 3/2015 | Tsirinsky-Feigin | H04L 63/0236 370/242 |
| 2015/0120914 | A1* | 4/2015 | Wada | H04L 43/04 709/224 |
| 2015/0212909 | A1* | 7/2015 | Sporel | G06F 11/2023 714/4.11 |
| 2015/0264077 | A1* | 9/2015 | Berger | G06F 21/554 726/23 |
| 2015/0350047 | A1* | 12/2015 | Bird | H04L 67/42 709/224 |

OTHER PUBLICATIONS

Childress et al.; U.S. Appl. No. 15/074,044, filed Mar. 18, 2016; Entitled "Management of Decommissioned Server Assets in a Shared Data Environment".

List of IBM Patents or Patent Applications Treated as Related; Dated Jun. 23, 2016; 2 pages.

\* cited by examiner

MANAGEMENT OF DECOMMISSIONED SERVER ASSETS IN A SHARED DATA ENVIRONMENT

BACKGROUND OF THE INVENTION

The present invention relates generally to the field of server management, and more particularly to management of decommissioned server assets in a shared data environment.

When a server asset is decommissioned, many organizations may perform a process which removes all agents and associated software from that server. This process makes it so that the server resource cannot be monitored or managed using any kind of administrative tools. Some organizations may place an agent on the server itself, in order to monitor compliance with the decommissioning of the server asset. The agent monitors thresholds, such as last login, CPU load, operation of certain processes, and disk activity. If the monitored activity is inconsistent with a decommissioned server, a notification may be generated.

SUMMARY

According to an embodiment of the present invention, a method for monitoring decommissioned servers is provided, the method comprising: aggregating, by one or more processors, information associated with an environment, from a plurality of resources; analyzing, by one or more processors, the aggregated information associated with the environment; calculating, by one or more processors, a baseline of server activity, based on the aggregated information associated with the environment; determining, by one or more processors, whether new information associated with the environment is consistent with the baseline of server activity; and responsive to determining that the new information associated with the environment is not consistent with the baseline of server activity, identifying the new information as a possible misuse.

Another embodiment of the present invention provides a computer program product for monitoring decommissioned servers, based on the method described above.

Another embodiment of the present invention provides a computer system for monitoring decommissioned servers, based on the method described above.

DETAILED DESCRIPTION

Embodiments of the present invention provide systems and methods for monitoring, validating, and enforcing decommissioned server assets in a shared data environment by collecting information from a variety of ambient external sources and using the information to create a baseline of server activities, which is used for comparing the incoming information, in order to detect unusual server activity.

Figure 1A:
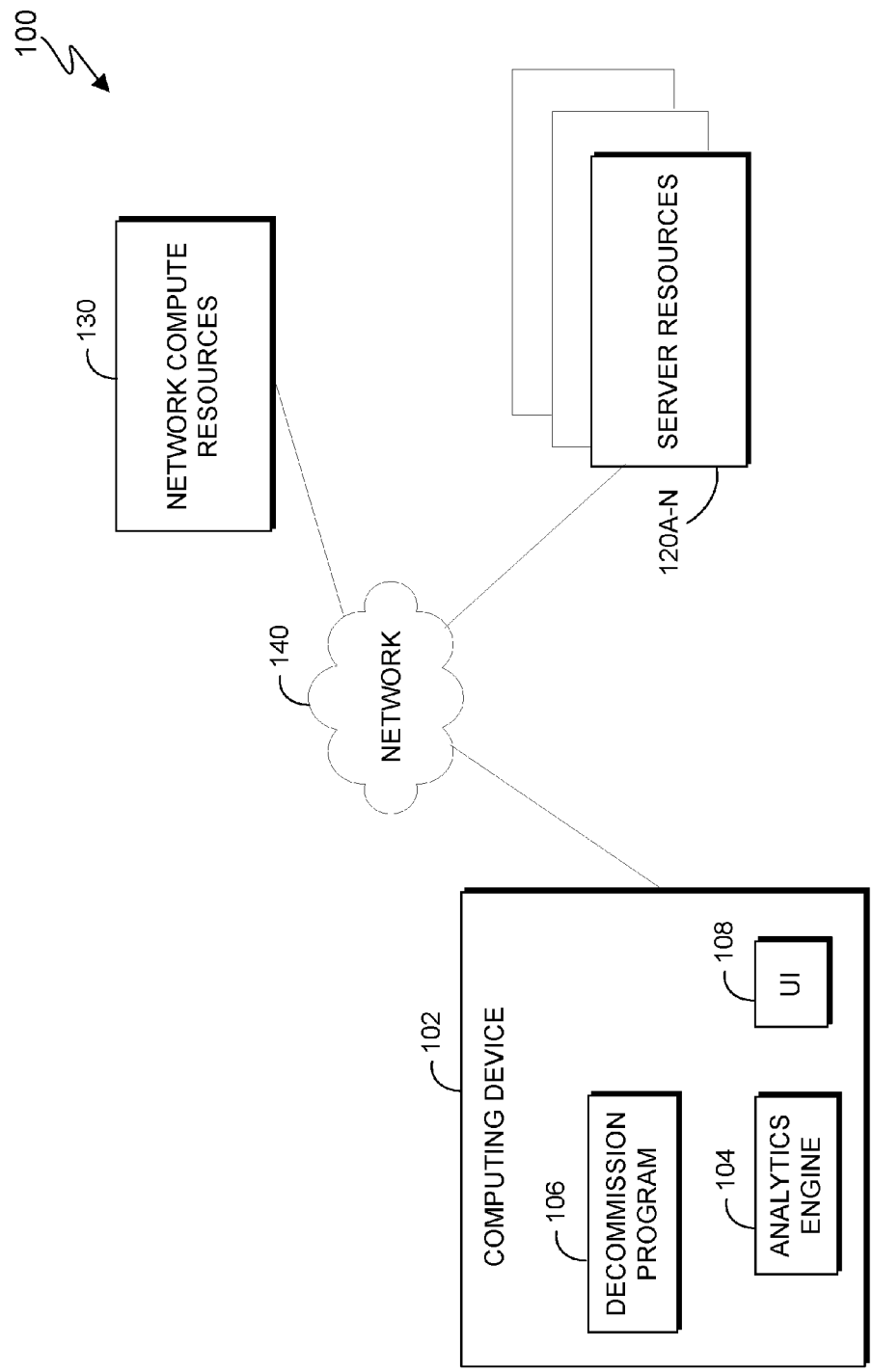
FIG. 1A depicts a functional block diagram illustrating a shared data environment, in accordance with an embodiment of the present invention.

The present invention will now be described in detail with reference to the Figures. FIG. 1A depicts a block diagram illustrating a shared data environment, generally designated 100, in accordance with an embodiment of the present invention. Modifications to shared data environment 100 may be made by those skilled in the art without departing from the scope of the invention as recited by the claims. In an exemplary embodiment, shared data environment 100 includes computing device 102, server resources 120A-N, and network compute resources 130, all interconnected via network 140.

Network 140 can be, for example, a local area network (LAN), a wide area network (WAN) such as the Internet, or a combination of the two, and can include wired, wireless, or fiber optic connections. In general, network 140 can be any combination of connections and protocols that will support communication and/or access between computing device 102, server resources 120A-N, and network compute resources 130.

In various embodiments of the present invention, computing device 102 can be a laptop computer, a tablet computer, a netbook computer, a personal computer (PC), a desktop computer, a personal digital assistant (PDA), a smart phone, a thin client, a wearable device, or any programmable mobile electronic device capable of executing computer readable program instructions. Computing device 102 may include internal and external hardware components, as depicted and described in further detail with respect to FIG. 3. Computing device 102 includes analytics engine 104, decommission program 106, and user interface (UI) 108.

UI 108 may be, for example, a graphical user interface (GUI) or a web user interface (WUI) and can display text, documents, web browser windows, user options, notifications, application interfaces, and instructions for operation, and includes the information (such as graphic, text, and sound) a program presents to a user and the control sequences the user employs to control the program. UI 108 is capable of receiving data, user commands, and data input modifications from a user. UI 108 is also capable of communicating with decommission program 106, and displaying notifications based on data obtained from decommission program 106. In some embodiments, UI 108 can be integrated with decommission program 106.

In this exemplary embodiment, analytics engine 104 and decommission program 106 operate together, receiving server information from network compute resources 130. Analytics engine 104 applies commission/decommission analytics to the information gathered from server resources 120A-N. Decommission program 106 establishes a baseline of server activity, based on the received ambient information collected from external sources. Decommission program 106 can determine whether server activity is inconsistent with the established baseline of activity.

Network compute resources 130 include information from such sources as DNS servers, application servers, database servers, storage systems, firewalls, routers, switches, etc., used in the shared data environment 100. Server resources 120A-N include the server resources of shared data environment 100. The activity of server resources 120A-N may be monitored by decommission program 106.

The following are several examples of both intentional and unintentional misuse or miss-classification of server resources in a managed data center, for which the present invention may be implemented. In the first example, a company may bill for the management of resources. Servers which are labeled as "decommissioned" are removed from billing, but may be accidentally reactivated after a billing cycle, which results in large billing losses.

In a second example, a server resource labeled as "decommissioned" may find itself back on the network shortly after being decommissioned, being misused as a compute resource for unauthorized activities (e.g., game server, copyright material clearinghouse, bitcoin mining, etc.).

In a third example, a server resource may be leveraged for benevolent undertakings, such as contributing resources to grid-computing projects or establishing a web server to host a local application. In these cases, the server operator did not seek approval, however, did not believe they were misusing the server resource.

Figure 1B:
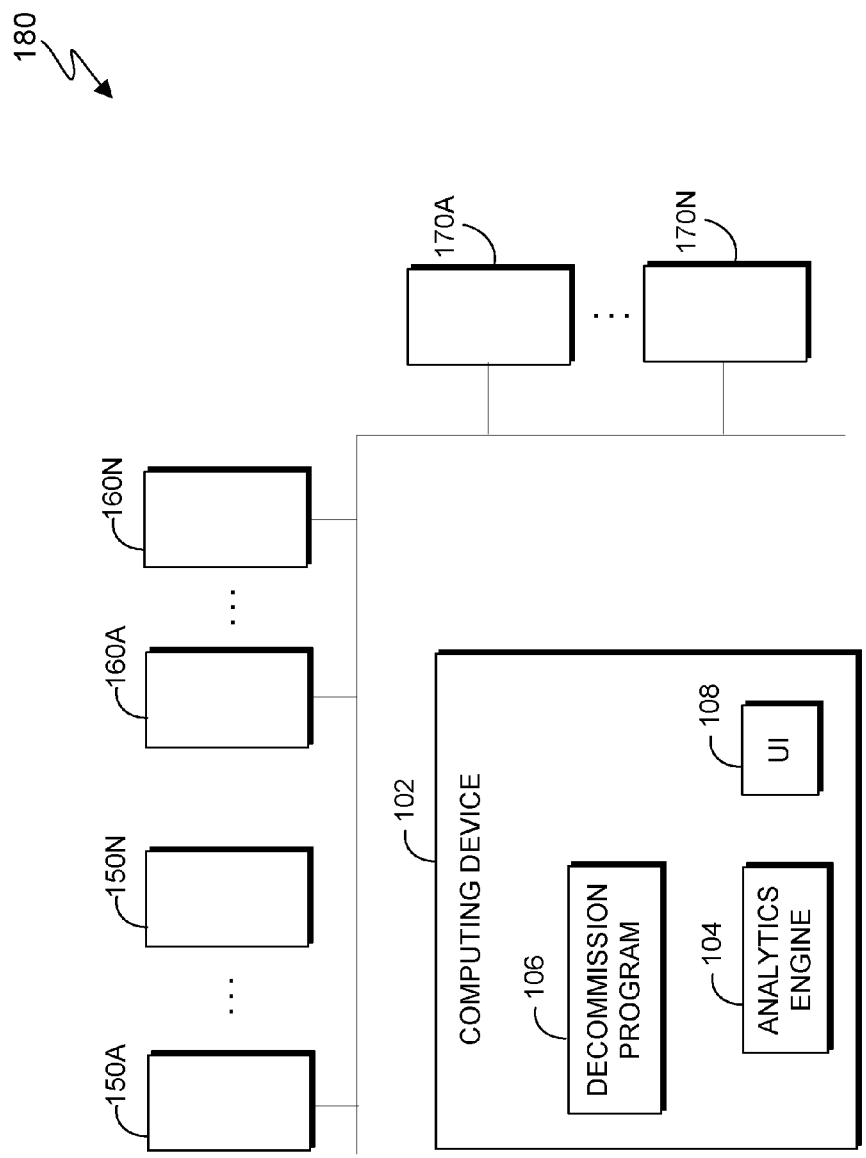
FIG. 1B depicts a block diagram illustrating active and decommissioned server assets in a shared data environment, in accordance with an embodiment of the present invention.

FIG. 1B depicts a block diagram illustrating active and decommissioned server assets in a shared data environment, in accordance with an embodiment of the present invention.

FIG. 1B depicts a block diagram illustrating a shared data environment, generally designated 180, in accordance with an embodiment of the present invention. Modifications to shared data environment 180 may be made by those skilled in the art without departing from the scope of the invention as recited by the claims. In an exemplary embodiment, shared data environment 180 includes computing device 102 and the operational assets include: active servers 150A-N, active servers 160A-N, and decommissioned servers 170A-N. In this exemplary embodiment, active servers 150A-N are active servers which are covered by service level agreements (SLAs) and active servers 160A-N are active servers which are not covered by SLAs. Decommissioned servers 170A-N are server assets of shared data environment 180, which have been decommissioned.

Figure 2:
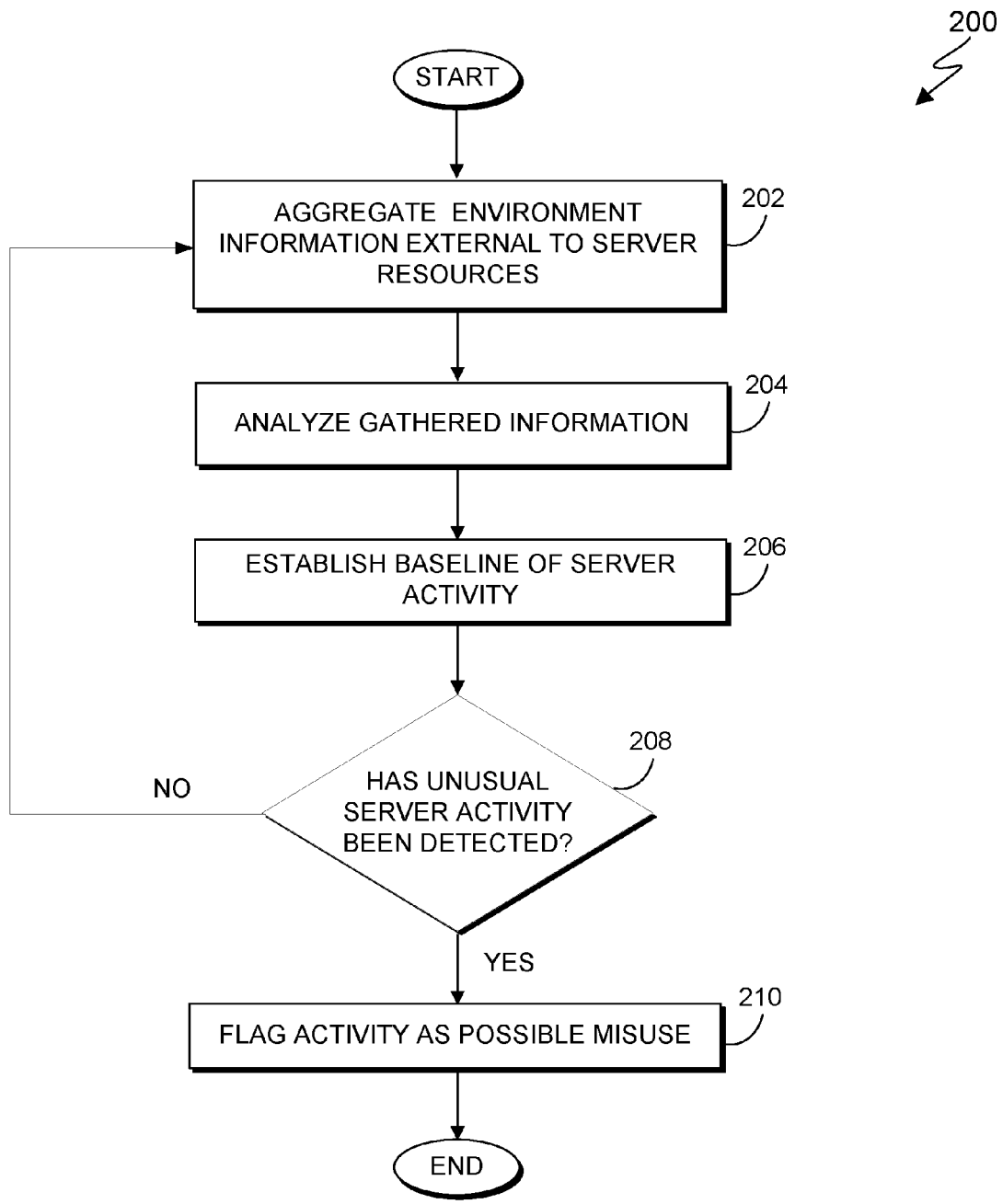
FIG. 2 depicts is a flowchart illustrating operational steps for monitoring and validating decommissioned server assets, in accordance with an embodiment of the present invention.

FIG. 2 is a flowchart illustrating operational steps for monitoring and validating decommissioned server assets, in accordance with an embodiment of the present invention.

In step 202, decommission program 106 aggregates the environment information which is external to the server resources. In this exemplary embodiment, decommission program 106 collects ambient information from a variety of external sources (i.e., network compute resources 130), such as network traffic, incident problems and change systems, network device logs, etc. These sources provide a good historical indication on activities related to all the server resources 120A-N within shared data environment 100. In one embodiment, the information is directly gathered through direct entry of assets to the decommission program 106, from electronic versions of documentation, e.g., service level agreements (SLA), contracts, etc., or from network management programs and from monitoring of address resolution protocol (ARP) cache data from routers.

In step 204, decommission program 106 analyzes the gathered information. In this exemplary embodiment, decommission program 106 analyzes the information gathered from the ambient external sources, and applies analytics to the information. The information may include, for example, a record of requesting the decommissioning of a server resource and/or network traffic data, which may provide a means to analyze traffic spikes of decommissioned servers and to provide insights as to the source and type of traffic.

In step 206, decommission program 106 establishes a baseline of server activity. In this exemplary embodiment, decommission program 106 uses the information obtained to establish a baseline level of server activity. The baseline of server activity is obtained from the SLA, contracts, and from network monitoring, and comparison of network activity from the ARP cache data, which shows assets that are decommissioned (i.e., inactive) continuing to be active. A collection of the ambient external sources of information serve as the mechanism to create a baseline for normal server environment activities, across shared data environment 100. The baseline level of server activity includes normal uses, and use ranges, for the server. For example, some monitored server activities may include service requests, network traffic, DNS requests, from/to traffic, etc.

In step 208, decommission program 106 determines whether unusual server activity has been detected. For example, if a server that is decommissioned begins to receive low traffic, this may not raise any activity concerns. However, if ambient analytics shows that historically, the server traffic comes from a specific network, and recent analytics reveals that the traffic is sourcing from IP addresses unknown to be popular in the gaming community, this may indicate a misuse from the policy. In this embodiment, decommission program 106 can track network traffic, as well as the types of packets from the decommissioned assets, in order to detect unusual server activity from both the type, and amount, of communications. For example, database transactions between a decommissioned application server with a storage system may strongly indicate that the system is still operational.

If, in step 208, decommission program 106 determines that unusual server activity has been detected, then, in step 210, decommission program 106 flags the activity as possible misuse.

If, in step 208, decommission program 106 determines that unusual server activity has not been detected, then decommission program 106 continues to aggregate environment information external to the server resources (i.e., step 202).

Accordingly, by performing the operations of FIG. 2, decommission program 106 can continuously collect data and apply ambient analytics to the collected data, in order to form a historical pattern of server use, allowing for future models to understand the 'expected' behavior of the server resources. Accordingly, a use of the analytics provides a method and system for monitoring, validating, and enforcing decommissioned server assets in a shared data environment.

Figure 3:
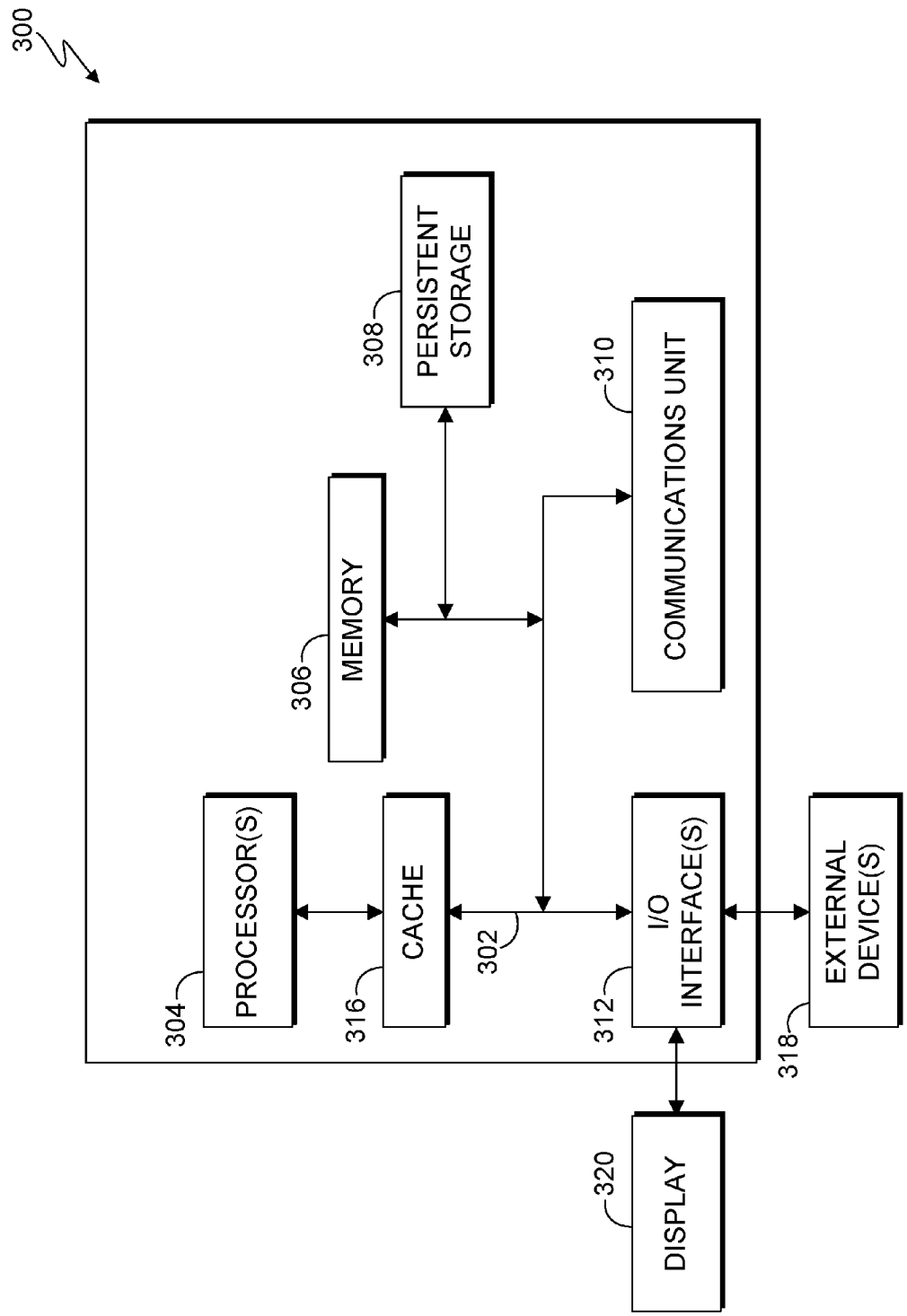
FIG. 3 depicts a block diagram of components of a computing device, in accordance with an illustrative embodiment of the present invention.

FIG. 3 is a block diagram of internal and external components of a computing device, generally designated 300, which is representative of the computing devices of FIG. 1, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computing device 300 includes communications fabric 302, which provides communications between computer processor(s) 304, memory 306, cache 316, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM). In general, memory 306 can include any suitable volatile or non-volatile computer readable storage media. Cache 316 is a fast memory that enhances the performance of processors 304 by holding recently accessed data, and data near recently accessed data, from memory 306.

Program instructions and data used to practice embodiments of the present invention may be stored in persistent storage 308 and in memory 306 for execution by one or more of the respective processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of a network. In these examples, communications unit 310 includes one or more network interface cards. Communications unit 310 may provide communications through the use of either or both physical and wireless communications links. Program instructions and data used to practice embodiments of the present invention may be downloaded to persistent storage 308 through communications unit 310.

I/O interface(s) 312 allows for input and output of data with other devices that may be connected to computing device 300. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention (e.g., software and data) can be stored on such portable computer-readable storage media and can be loaded onto persistent storage 308 via I/O interface(s) 312. I/O interface(s) 312 also connect to a display 320.

Display 320 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for monitoring decommissioned servers, the computer program product comprising:
   a non-transitory computer readable storage medium and program instructions stored on the non-transitory computer readable storage medium for execution by at least one computer processor, the program instructions comprising:
   program instructions to aggregate information associated with an environment, from a plurality of resources external to a server resource, wherein the plurality of resources external to the server resource provide a historical indication on activities related to the server resource within the environment, and wherein the information is directly gathered from monitoring address resolution protocol (ARP) cache data from a router;
   program instructions to analyze the aggregated information associated with the environment;
   program instructions to calculate a baseline of server activity, based on a comparison of network activity from the ARP cache data associated with the environment, which shows decommissioned assets continuing to be active;
   program instructions to determine whether new information associated with the environment is consistent with the baseline of server activity, wherein network traffic and types of packets from decommissioned assets are used to detect whether new information associated with the environment is consistent with the baseline of server activity; and
   program instructions to, responsive to determining that the new information associated with the environment is not consistent with the baseline of server activity, identify the new information as a possible misuse and flag the new information associated with unusual server activity.

* * * * *